United States Patent
Chiba

(10) Patent No.: US 8,077,304 B2
(45) Date of Patent: Dec. 13, 2011

(54) LIGHT AMOUNT MEASURING APPARATUS

(75) Inventor: Tadashi Chiba, Chiba (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 12/591,974

(22) Filed: Dec. 7, 2009

(65) Prior Publication Data

US 2010/0141935 A1 Jun. 10, 2010

(30) Foreign Application Priority Data

Dec. 8, 2008 (JP) ................................. 2008-312404

(51) Int. Cl.
*G01J 1/42* (2006.01)
*H01L 31/075* (2006.01)

(52) U.S. Cl. ...................... 356/218; 356/213; 250/214.1

(58) Field of Classification Search .................. 356/213, 356/218; 250/214.1, 214 SW, 214 A, 214 R, 250/208.2, 208.4
See application file for complete search history.

(56) References Cited

U.S. PATENT DOCUMENTS

| | | | | |
|---|---|---|---|---|
| 4,145,139 A | * | 3/1979 | Nakamura et al. | 356/73 |
| 4,222,644 A | * | 9/1980 | Tano et al. | 396/292 |
| RE31,207 E | * | 4/1983 | Tsunekawa et al. | 250/214 R |
| 4,389,109 A | * | 6/1983 | Taniguchi et al. | 396/56 |
| 4,417,794 A | * | 11/1983 | Nakai et al. | 396/167 |
| 4,891,519 A | * | 1/1990 | Nohira et al. | 250/349 |
| 4,929,977 A | * | 5/1990 | Ishikawa et al. | 396/169 |
| 4,959,676 A | * | 9/1990 | Matsuda et al. | 396/67 |
| 6,095,661 A | * | 8/2000 | Lebens et al. | 362/184 |
| 7,214,922 B2 | * | 5/2007 | Takiba et al. | 250/208.4 |

FOREIGN PATENT DOCUMENTS

| | | |
|---|---|---|
| JP | 2005-337827 A | 12/2005 |
| JP | 2006-332226 A | 12/2006 |

* cited by examiner

*Primary Examiner* — Sang Nguyen
(74) *Attorney, Agent, or Firm* — Rabin & Berdo, P.C.

(57) ABSTRACT

A light amount measuring apparatus including a light amount measuring circuit and a power supply for supplying power to the light amount measuring circuit; wherein the light amount measuring circuit includes a light receiving device for receiving light and outputting an electric signal corresponding to light amount of the received light; a first switch for switching between electrical connection and disconnection between the light receiving device and the power supply; and a drive controller for controlling the first switch so that the first switch electrically connects the light receiving device to the power supply when the light receiving device is set to an activated state and electrically disconnects the light receiving device from the power supply when the light receiving device is set to a deactivated state.

7 Claims, 3 Drawing Sheets

LIGHT AMOUNT MEASURING APPARATUS

BACKGROUND OF THE INVENTION

1. Field of the Invention

The present invention relates to a light amount measuring apparatus which receives light and measures light amount of the received light.

2. Description of the Related Art

In recent years, the use of the light amount measuring apparatus for measuring light amount of the received light having predetermined wavelengths (e.g., wavelengths included in sunlight wavelengths) is widespread. For example, Japanese Patent Application Kokai Publication No. 2005-337827 (patent document 1) discloses an illuminance sensor including a photodiode that has sensitivity to both visible light and infrared light and an optical filter that is disposed on a light incident surface of the photodiode and blocks infrared light. In this sensor, the photodiode is reverse-biased by the power supply in order to measure light amount of the received light.

Furthermore, Japanese Patent Application Kokai Publication No. 2006-332226 (patent document 2) discloses a semiconductor photosensor device including a couple of photodiodes formed on a silicon substrate and an infrared transmitting filter that is disposed on one of the photodiodes and blocks visible light. In this device, both photodiodes are reverse-biased by the power supply in order to measure light amount of the received light, and the light amount of visible light is obtained by calculating deference between the outputs of the photodiodes.

However, in the device of patent document 1 or 2, since the photodiode or photodiodes are directly connected to the power supply, even if the device is set to an OFF-state, a comparatively large consumption current corresponding to light amount of the received light is generated in the photodiode or photodiodes when it receives light. Accordingly, there is a problem that electric power consumption exists due to the photodiode which is being irradiated with light, even when the device is in OFF-state.

SUMMARY OF THE INVENTION

The object of the present invention is to provide a light amount measuring apparatus that can suppress electric power consumption when the light receiving device is set to a deactivated state.

According to the present invention, a light amount measuring apparatus includes a light amount measuring circuit; and a power supply for supplying power to the light amount measuring circuit; wherein the light amount measuring circuit includes: a light receiving device for receiving light and outputting an electric signal corresponding to light amount of the received light; a first switch for switching between electrical connection and disconnection between the light receiving device and the power supply; and a drive controller for controlling the first switch so that the first switch electrically connects the light receiving device to the power supply when the light receiving device is set to an activated state and electrically disconnects the light receiving device from the power supply when the light receiving device is set to a deactivated state.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

In this embodiment, a description will be made as to an example that the present invention is applied to a light amount measuring apparatus incorporated in a mobile phone. However, the present invention can be applied to various type of equipment other than the mobile phone, that receives light, measures light amount (or light intensity) of the received light, and emits light, the intensity of which is set on the basis of the measured light amount.

Figure 1:
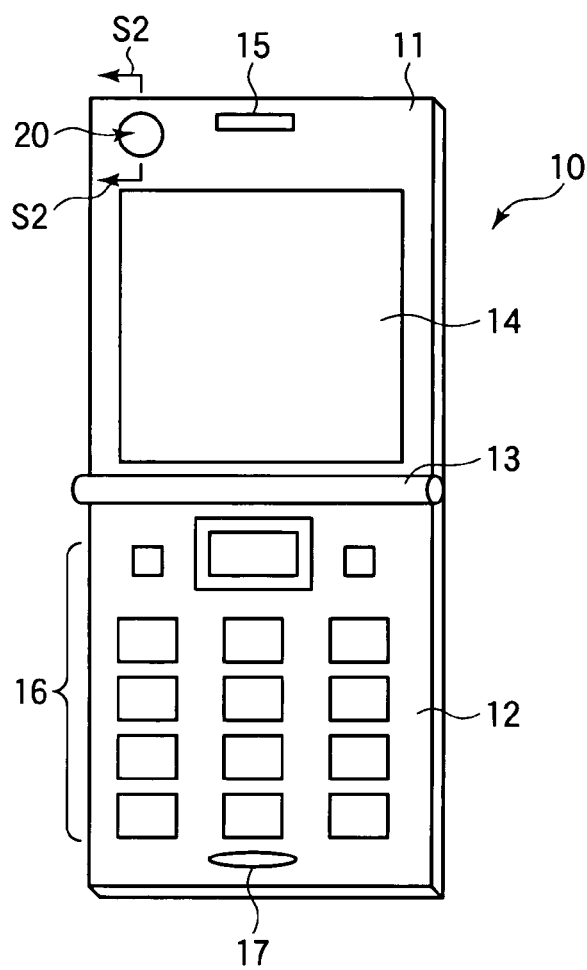
FIG. 1 is an external view of a mobile phone incorporating a light amount measuring apparatus according to an embodiment of the present invention.

FIG. 1 is an external view of a mobile phone 10 incorporating a light amount measuring apparatus 20 according to an embodiment of the present invention. Referring to FIG. 1, a mobile phone 10 includes a display part 11, an operating part 12, and a connecting part 13 which connects the display part 11 to the operating part 12 so that the display part 11 can rotate around the connecting part 13 so as to be opened or closed with reference to the operating part 12.

The display part 11 has a liquid crystal display (LCD) 14 for displaying a telephone number list, a world wide web (WWW) browser, a keyboard image used for inputting letters, and so on. The display part 11 also has a light amount measuring apparatus 20 for receiving light such as a light beam from the sun or an indoor light and measuring light amount of the received light, and a speaker 15 for outputting a sound.

The operating part 12 has a plurality of operation keys 16 used for inputting telephone numbers, characters, commands for various types of operating modes, and so on, and a microphone 13 for picking up a sound. The operating modes in the mobile phone 10 includes a conversation mode for making a call on another phone, a WWW mode for communicating with a network using the WWW browser, a light amount measuring mode, in which the light amount measuring apparatus 20 measures light amount of the received light, and so on.

Figure 2:
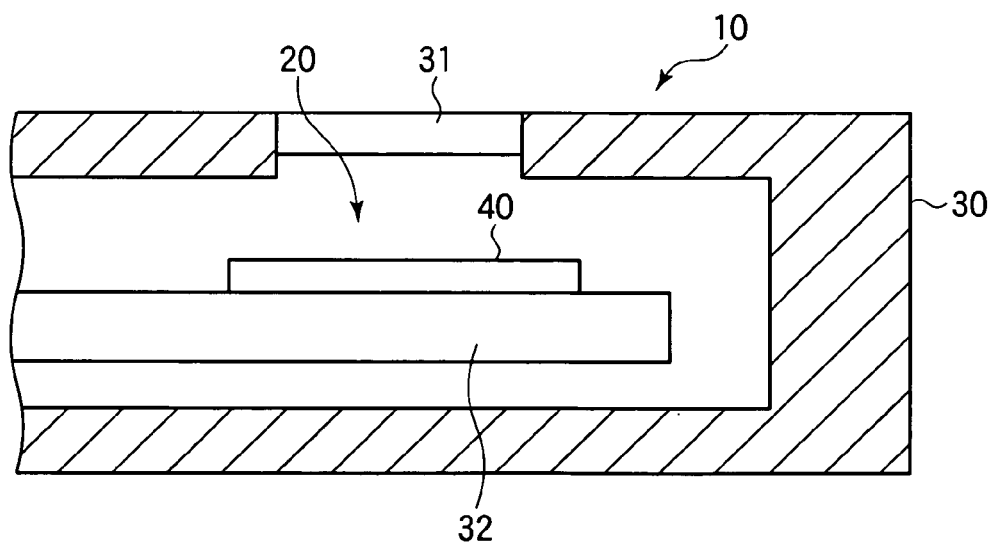
FIG. 2 is a schematic cross sectional view taken along a line S2-S2 in FIG. 1.

FIG. 2 is a schematic cross sectional view of the mobile phone 10 incorporating the light amount measuring apparatus 20 taken along a line S2-S2 in FIG. 1. Referring to FIG. 2, the light amount measuring apparatus 20 includes a light transmitting cover 31 fixed in a hole of a case member 30 of the operating part 12, through which light can pass, and a light amount measuring circuit 40 disposed on a substrate 32 in the case member 30 of the operating part 12. The light amount measuring circuit 40 receives light which has passed through the light transmitting cover 31 at a light receiving device (41 shown in FIG. 3) and measures light amount of the received light to output a voltage corresponding to the measured light amount. Further, the light amount measuring circuit 40 may be configured so as to be capable of measuring light amount of a light component of specific wavelengths (e.g., visible light or infrared light or ultraviolet light) of the received light.

Figure 3:
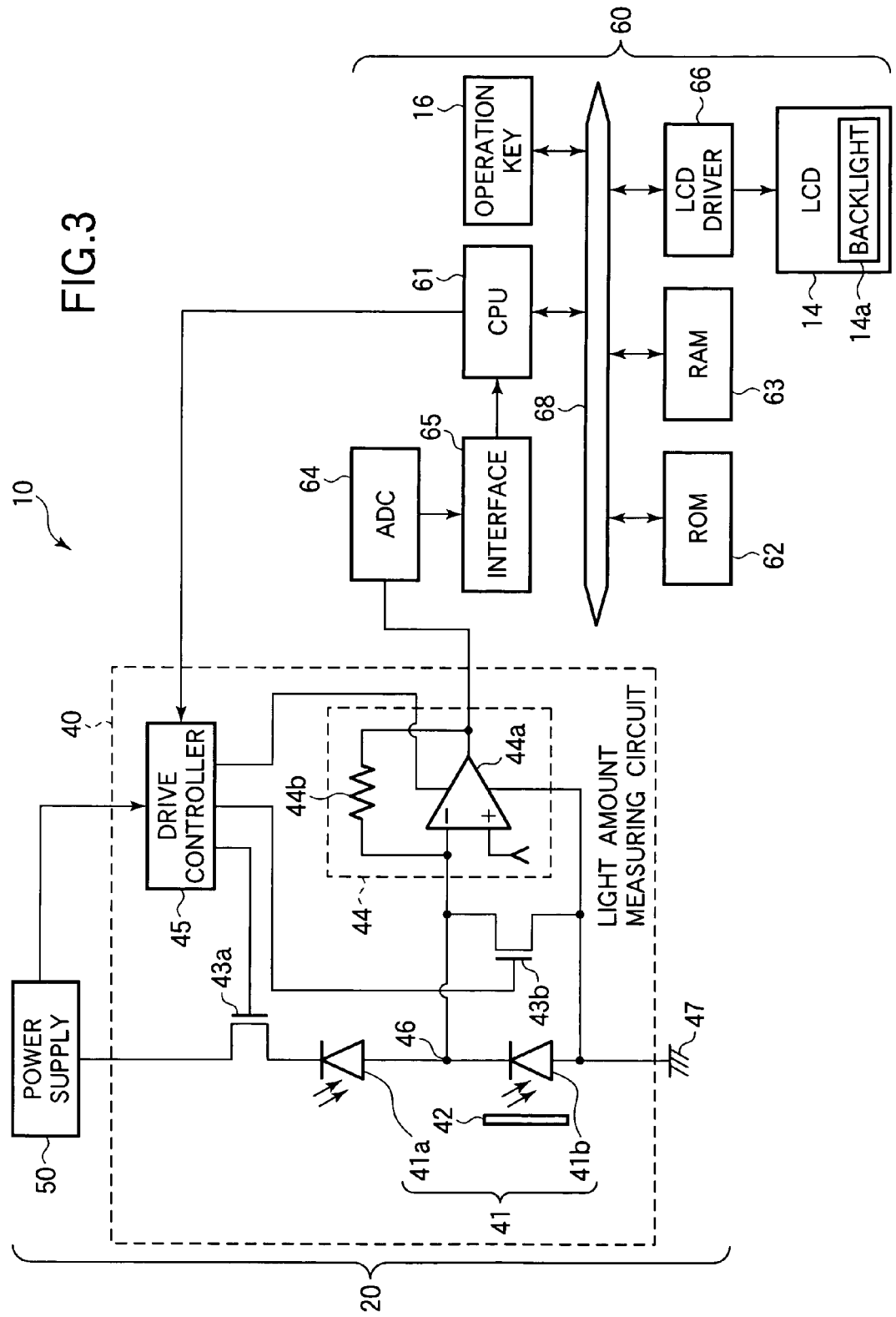
FIG. 3 is a diagram showing a main configuration of the mobile phone, wherein the light amount measuring apparatus according to the embodiment is illustrated as a circuit diagram.

FIG. 3 is a diagram showing a main configuration of the mobile phone 10. FIG. 3 also shows a circuit diagram illustrating the light amount measuring apparatus 20 according to the embodiment. The light amount measuring apparatus 20 will be described with reference to FIG. 3.

Referring to FIG. 3, the mobile phone 10 includes a phone section 60 and the light amount measuring apparatus 20. The phone section 60 includes a central processing unit (CPU) 61 for controlling operation of the whole of the mobile phone 10, a read only memory (ROM) 62 for storing various types of control programs, various types of table information, and so on in advance, a random access memory (RAM) 63 used as a work area when the CPU 61 executes various programs and used for storing various information, an analog digital converter (ADC) 64 for converting a voltage output from the light amount measuring circuit 40 to digital information when the light amount measuring mode is set; an interface 65 for converting the digital information output from the ADC 64 to other type of information that can facilitate processing by the CPU 61 and outputting the converted information; and an LCD driver 66 for generating a signal for displaying a telephone number list, a WWW browser, etc., on the LCD 14 and supplying the signal to the LCD 14, thereby controlling the light intensity of the backlights 14a of the LCD14.

The light amount measuring apparatus 20 includes a light amount measuring circuit 40 and a power supply 50 for supplying power to the light amount measuring circuit 40. The light amount measuring circuit 40 includes a light receiving device 41 for receiving light and outputting an electric signal corresponding to light amount of the received light. The light receiving device 41 includes a first light receiving element 41a disposed between the first switch 43a and the output node 46; a second light receiving element 41b disposed between the output node 46 and the ground 47. An optical filter 42 is disposed so as to cover a light incident surface of the second light receiving element 41b and blocking light with specific or predetermined wavelengths. The light amount measuring circuit 40 includes a first switch 43a for switching between electrical connection and disconnection between the light receiving device 41 and the power supply 50; and a drive controller 45 for controlling the first switch 43a so that the first switch 43a electrically connects the light receiving device 41 to the power supply 50 when the light receiving device 41 is set to an activated state and electrically disconnects the light receiving device 41 from the power supply 50 when the light receiving device 41 is set to a deactivated state.

The CPU 61, the ROM 62, the RAM 63, the LCD driver 66, and the operation keys 16 are electrically connected through a system bus 68 with each other. Therefore, the CPU 61 can access the ROM 62 and the RAM 63, can control the LCD driver 66 so as to cause the LCD 14 to display various types of information, and can obtain operational states of the operation keys 16.

Further, the CPU 61 outputs a light amount measuring mode signal indicating whether a light amount measuring mode is set or not to the drive controller 45 of the light amount measuring circuit 40. The CPU 61 outputs a H-level (high level) signal as the light amount measuring mode signal to the drive controller 45 of the light amount measuring circuit 40 when the light amount measuring mode is set. On the other hand, the CPU 61 outputs an L-level (low level) signal as the light amount measuring mode signal to the light amount measuring circuit 40 when the light amount measuring mode is reset.

Next, the light amount measuring circuit 40 will be described in detail. Referring to FIG. 3, the light amount measuring circuit 40 includes photodiodes 41a and 41b as the light receiving elements of the light receiving device 41. Each of the photodiodes 41a and 41b outputs an electric signal (e.g., a current signal in this embodiment) corresponding to light amount of the received light. The light amount measuring circuit 40 also includes an FET 43a as the first switch which is disposed between the photodiode 41a and the power supply 50 and switches between electrical connection and disconnection between the photodiode 41a and the power supply 50. Further, the light receiving elements of the light receiving device 41 are not limited to the photodiodes, but they may be other photoelectric elements such as photo transistors.

The light amount measuring circuit 40 further includes an FET 43b as the second switch for switching between electrical connection and disconnection of the output node 46 of the light receiving device 41 and a ground 47, and the drive controller 45. The drive controller 45 controls the second switch 43b so that the second switch 43b electrically connects the output node 46 of the light receiving device 41 to the ground 47 when the light receiving device 41 is set to a deactivated state and electrically disconnects the output node 46 of the light receiving device 41 from the ground 47 when the light receiving device 41 is set to an activated state. Further, the first and second switches are not limited to the FETs, but they may be other types of semiconductor switches such as bipolar transistors or mechanical switches such as relay switches.

Both of the photodiodes 41a and 41b have sensitivity to both visible light and infrared light. The optical filter is disposed on the light incident surface of the photodiode 41b and blocks the visible light, for example. However, the number of the photodiodes, the types of the photodiodes, the type of the optical filter, and the position of the optical filter are not limited to the above described example.

An output terminal of the power supply 50 is electrically connected to a source of the FET 43a. A drain of the FET 43a is electrically connected to a cathode of the photodiode 41a. An anode of the photodiode 41a is electrically connected to a cathode of the photodiode 41b and the output node 46. An anode of the photodiode 41b is electrically connected to the ground 47.

The output node 46 between the anode of the photodiode 41a and the cathode of the photodiode 41b is electrically connected to an amplifier circuit 44. Further, the source of the FET 43b is electrically connected to the output node 46, the drain of the FET 43b is electrically connected to the ground 47. Furthermore, a gate of the FET 43a is electrically connected to the drive controller 45, and a gate of the FET 43b is electrically connected to the drive controller 45.

The amplifier circuit 44 has an operational amplifier 44a with a resister 44b. An inverting input terminal of the operational amplifier 44a is electrically connected to the output node 46 as well as electrically connected to an output terminal of itself through the resister 44b. On the other hand, a predetermined reference voltage is applied to a non inverting input terminal of the operational amplifier 44a. Accordingly, the operational amplifier 44a has a current-voltage converting function. Further, the power supply terminal for receiving power for operating the operational amplifier 44a is electrically connected to the drive controller 45. The power for operating the operational amplifier 44a is supplied through the drive controller 45 from the power supply 50.

The drive controller 45 receives control signals such as a light amount measuring mode signal from the CPU 61. The light receiving device 41 is set to the activated state when the drive controller 45 receives a control signal for setting the light amount measuring apparatus 20 to a light amount measuring mode, and the light receiving device 41 is set to the deactivated state when the drive controller 45 receives another control signal for resetting the light amount measuring mode. On the basis of the state of the light amount measuring mode signal, the drive controller 45 switches on/off of the FETs 43a and 43b and switches a state (activated/deactivated) of the operational amplifier 44a.

Further, the mobile phone 10 may be configured so that the light receiving device 41 is set to the activated state when the drive controller 45 receives a control signal for setting the light amount measuring apparatus 20 to the activated state when the drive controller 45 receives a control signal for setting the light amount measuring apparatus 20 to an ON-state, and the light receiving device 41 is set to the deactivated state when the drive controller 45 receives another control signal for setting the light amount measuring apparatus 20 to an OFF-state.

Figure 4:
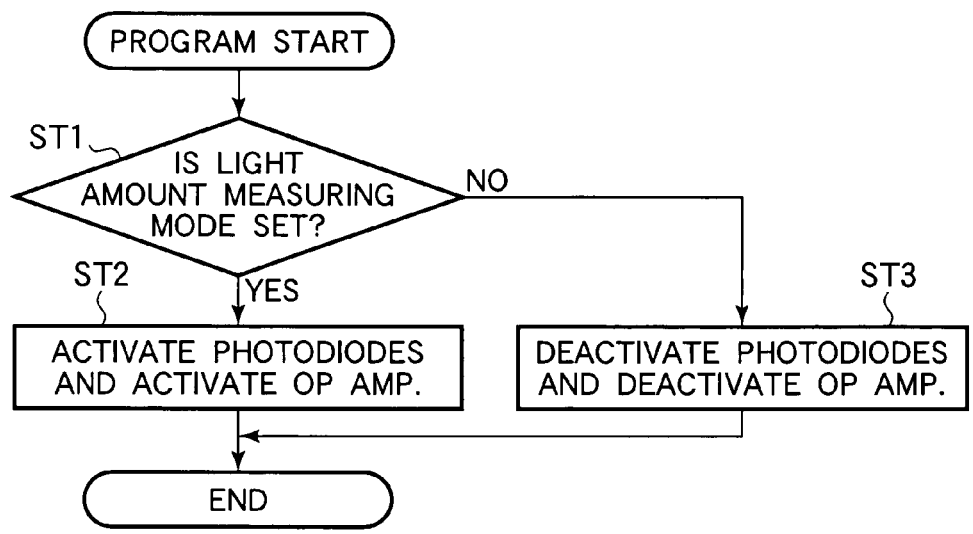
FIG. 4 is a flowchart showing processes based on a light amount measuring operation control program in the embodiment.

Next, operation of the mobile phone 10 will be described with reference to FIG. 4. FIG. 4 is a flowchart showing processes of a light amount measuring operation control program stored in a predetermined region of the ROM 62 and executed by the CPU 61 when a command signal of setting or resetting of the light amount measuring mode is input through the operation keys 16.

In step ST1, the program determines whether the light amount measuring mode is set or not. If the determination is true, process advances to step ST2 from step ST1. If the determination is false, process advances to step ST3 from step ST1.

In step ST2, the photodiodes 41a and 41b are activated, the output node 46 and the ground 47 are electrically disconnected by the FET 43b, and the operational amplifier 44a is set to be activated.

Specifically, the CPU 61 outputs a high level signal as the light amount measuring mode signal to the drive controller 45. When receiving the high level signal as the light amount measuring mode signal, the drive controller 45 applies a predetermined voltage (ON voltage) for making the FET 43a ON-state to the gate of the FET 43a, thereby electrically connecting the photodiodes 41a and 41b to the power supply 50 through the FET 43a.

When receiving the high level signal as the light amount measuring mode signal, the drive controller 45 applies a predetermined voltage (OFF voltage), which is lower than the ON voltage, for making the FET 43b OFF-state to the gate of the FET 43b, thereby electrically disconnecting the photodiode 41b from the ground 47. Further, when receiving the high level signal as the light amount measuring mode signal, the drive controller 45 supplies power to a power supply terminal of the operational amplifier 44a. Power is supplied to the power supply terminal of the operational amplifier 44a through the drive controller 45 from the power supply 50.

As described above, since the photodiodes 41a and 41b are electrically connected to the power supply 50 through the FET 43a, the photodiodes 41a and 41b are reverse-biased, thereby outputting a current corresponding to light amount of the received light. Both of the photodiodes 41a and 41b have sensitivity to visible light and infrared light and an optical filter for blocking visible light is disposed on the light receiving surface of the photodiode 41b. Therefore, in this embodiment, the photodiode 41a generates a detection current Ia corresponding to light amount of the visible and infrared light, and the photodiode 41b generates a detection current Ib corresponding to light amount of the infrared light. At this time, since the FET 43b is in OFF-state, a current Ic obtained by subtracting the detection current Ib from the detection current Ia, that is, a current corresponding to light amount of visible light is input to the operational amplifier 44a through the output node 46, the operational amplifier 44a converts the input current Ic to a voltage signal, thereby outputting it to the ADC 64. This voltage is converted to digital information by the ADC 64, and the digital information indicates light amount measured by the light amount measuring circuit 40. The CPU 61 controls the LCD driver 66 and the LCD 14 so that the intensity of light emitted from backlights 14a of the LCD 14 is decreased when the light amount indicated by the digital information is large, and the intensity of light emitted from backlights 14a of the LCD 14 is increased when the light amount indicated by the digital information is small.

On the other hand, in step ST3, if the light amount measuring mode has been reset, the photodiodes 41a and 41b are deactivated and the output node 46 and the ground 47 are electrically connected by the FET 43b, and the operational amplifier 44a is deactivated.

Specifically, the CPU outputs a low level signal as the light amount measuring mode signal to the drive controller 45. When receiving the low level signal as the light amount measuring mode signal, the drive controller 45 applies the OFF voltage to the gate of the FET 43a and causes the FET 43a to electrically disconnect the photodiodes 41a and 41b from the power supply 50, thereby setting the photodiodes 41a and 41b to a deactivated state. The drive controller 45 applies the gate of the FET 43b to the ON voltage, thereby electrically connecting the output node 46 to the ground 47 through the FET 43b. In order to deactivate the operational amplifier 44a, the power supply to the operational amplifier 44a is stopped by the drive controller 45.

As described above, when the FET 43a electrically disconnects the photodiodes 41a and 41b from the power supply 50, the reverse-biasing to the photodiodes 41a and 41b is stopped and power consumption of the power supply 50 can be suppressed.

However, even when the photodiodes 41a and 41b are not reverse biased, there may be cases where a current is generated when they receives light. As a result, when the output node 46 is not grounded, even if the operational amplifier 44a is deactivated, there is probability that a current flows from a path of the resister 44b to the power supply 50 and power consumption occurs. For this reason, in the mobile phone 10, when the photodiodes 41a and 41b are set to be deactivated, the drive controller 45 causes the FET 43b to electrically disconnect the output node 46 from the ground 47, thereby preventing the current generated in the photodiodes 41a and 41b from flowing to the power supply 50.

When the process in step ST2 or step ST3 is finished, the program ends.

Figure 5:
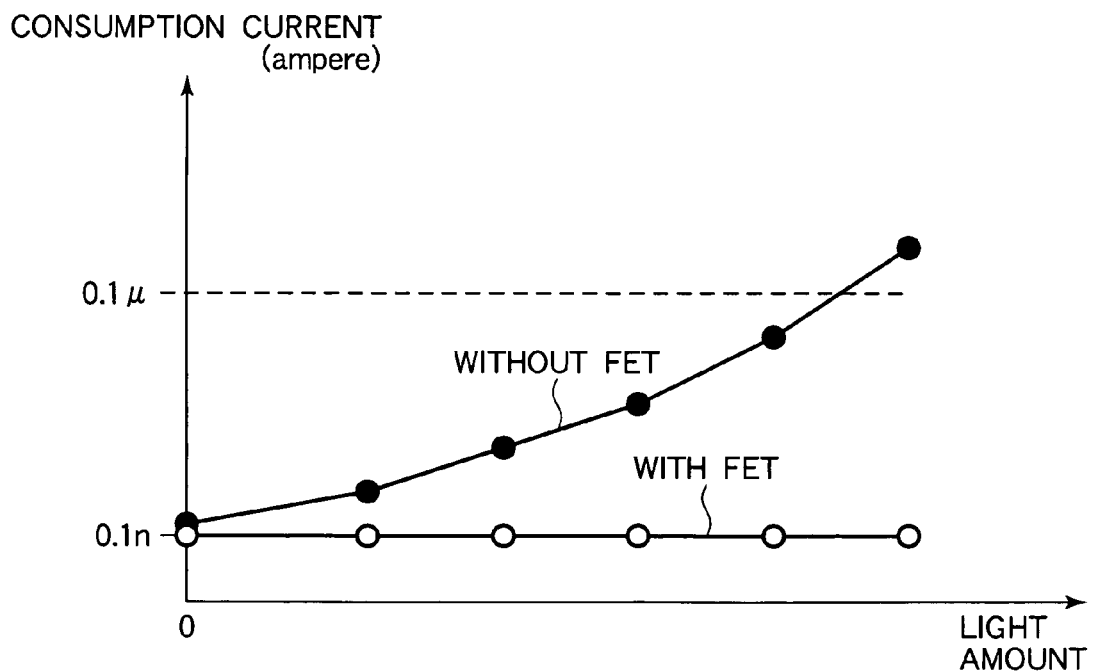
FIG. 5 shows graphs indicating relationships between light amount of the received light and consumption current in the embodiment (a line connecting white circles) and a comparative example (a line connecting black circles) when the apparatus is in OFF state.

FIG. 5 shows graphs indicating relationships between light amount of the received light and consumption current in the embodiment (a line connecting white circles) and a comparative example (a line connecting black circles) when the apparatus is in OFF state or is not in the light amount measuring mode. As shown in FIG. 5, in the light amount measuring circuit without the FET 43a (a comparative example), a consumption current (ampere) increases as the light amount of the received light increases. In contrast to this, in the light amount measuring circuit with the FET 43a (this embodiment), a consumption current (ampere) does not increase as the light amount of the received light increases.

As has been described above, in this embodiment, a light amount measuring apparatus 20 includes a light amount measuring circuit 40; and a power supply 50 for supplying power to the light amount measuring circuit 40, and the light amount measuring circuit 40 includes a light receiving device 41 for receiving light and outputting an electric signal corresponding to light amount of the received light; a first switch 41a for switching between electrical connection and disconnection between the light receiving device 41 and the power supply 50; and a drive controller 45 for controlling the first switch 41a so that the first switch 41a electrically connects the light receiving device 41 to the power supply 50 when the light receiving device 41 is set to an activated state and electrically disconnects the light receiving device 41 from the power supply 50 when the light receiving device is set to a deactivated state. Accordingly, the light amount measuring apparatus 20 can suppress electric power consumption when the light receiving device 41 is set to the deactivated state.

Further, in this embodiment, the light amount measuring circuit 40 further includes the amplifier circuit 44 for amplifying the electric signal output from the output node 46 of the light receiving device 41, and the drive controller 45 controls the amplifier circuit 44 so that the amplifier circuit 44 is activated when the light receiving device 41 is set to an activated state and electrically disconnects the light receiving device 41 from the power supply 50 when the light receiving device 41 is set to a deactivated state. Accordingly, the light amount measuring apparatus 20 can suppress electric power consumption more effectively when the light receiving device is set to a deactivated state.

Furthermore, in this embodiment, the light amount measuring circuit 40 further includes a second switch 43b for switching between electrical connection and disconnection between the output node 46 of the light receiving device 41 and the ground 47. The drive controller 45 controls the second switch 43b so that the second switch 43b electrically connects the output node 46 of the light receiving device 41 to the ground 47 when the light receiving device 41 is set to an activated state and electrically disconnects the output node 46 of the light receiving device 41 from the ground 47 when the light receiving device 41 is set to the deactivated state. Accordingly, the light amount measuring apparatus 20 can suppress electric power consumption more effectively when the light receiving device is set to a deactivated state.

Although the present invention was described in the above embodiment, the scope of the present invention is not limited to the above embodiment. The above embodiment can be changed and modified in various ways within the scope of the present invention.

Further, the above embodiment does not limit the scope of the invention described in the appended claims, and all of the features or their combinations described in the embodiment are not essential features of the present invention. The above described embodiment includes various types of stages of the invention, and the various types of modifications can be possible within the scope of the present invention. If the some constituent elements are removed from the above embodiment, the present invention can be realized so long as the effects of the present invention can be obtained.

Although in the above embodiment, the description has been made as to a case that when the light amount measuring mode is set, the photodiodes 41a and 41b are activated and when the light amount measuring mode is reset, the photodiodes 41a and 41b are deactivated, the present invention is not limited to this embodiment.

For example, the scope of the present invention includes a case that when the display part 11 is opened from the operating part 12 in the mobile phone 10, the photodiodes 41a and 41b are activated, and when the display part 11 is closed to the operating part 12 in the mobile phone 10, the photodiodes 41a and 41b are deactivated.

Furthermore, the scope of the present invention includes a case that when the mobile phone 10 is powered on, the photodiodes 41a and 41b are activated, and when the mobile phone 10 is powered off, the photodiodes 41a and 41b are deactivated.

In the above embodiment, although a description has been made as to a case that the light amount measuring apparatus 20 is disposed on a side (a front surface side) of the LCD 14 in the display part 11, the present invention is not limited to this example. The light amount measuring apparatus 20 may be disposed on an opposite side (a rear surface side) of the LCD 14 in the display part 11.

In the above embodiment, although a description has been made as to a case that the light amount measuring apparatus 20 is incorporated in the mobile phone 10, the present invention is not limited to this example. The light amount measuring apparatus 20 may be incorporated in other equipment such as a liquid crystal monitor of a mobile information terminal equipment (e.g., a personal digital assistant (PDA)) or a personal computer, an image display apparatus such as a liquid crystal television, a streetlight which is turned on during a predetermined time zone every day and is turned off during the other time, and the like.

If the light amount measuring apparatus 20 is incorporated in a streetlight, when the streetlight is turned on at a predetermined time, the photodiodes 41a and 41b are activated, light intensity of the street light is adjusted on the basis of the electric signal output from the light amount measuring circuit 40. When the streetlight is turned off, the photodiodes 41a and 41b are deactivated.

In the above embodiment, although a description has been made as to a case that the intensity of light emitted from the backlight 14a of the LCD 14 is adjusted on the basis of the light amount measured by the light amount measuring apparatus 20, the present invention is not limited to this example. The light amount measuring apparatus 20 may be applied to the equipment that can display the measured light amount on the display of the light amount display device. In this example, when the light amount display device is powered on, the photodiodes 41a and 41b are activated, and on the other hand, when the light amount display device is powered off, the photodiodes 41a and 41b are deactivated.

In the above embodiment, although a description has been made as to a case that the light amount of visible light is measured by the light amount measuring circuit 40, the present invention is not limited to this example. The light amount measuring apparatus may be formed so as to measure light amount of infrared light, ultraviolet light, or other light having predetermined wavelengths.

In addition, the configuration of the mobile phone 10 (FIG. 1 to FIG. 3) is just an example, and unnecessary component can be removed and/or other component can be added in various ways within the scope of the invention.

Furthermore, the above-described process shown in FIG. 4 by the light amount measuring operation control program is just an example. The above embodiments can be modified in various ways within the scope of the invention, which is defined in the appended claims.

What is claimed is:

1. A light amount measuring apparatus comprising:
a light amount measuring circuit; and
a power supply for supplying power to the light amount measuring circuit;
wherein the light amount measuring circuit includes:
a light receiving device for receiving light and outputting an electric signal at an output node of light receiving device, the electric signal corresponding to a light amount of the received light;
a first switch for switching between electrical connection and disconnection of the light receiving device and the power supply; and
a drive controller for controlling the first switch so that the first switch electrically connects the light receiving device to the power supply when the light receiving device is set to an activated state and electrically disconnects the light receiving device from the power supply when the light receiving device is set to a deactivated state.

2. The light amount measuring apparatus according to claim 1, wherein:
the light amount measuring circuit further includes an amplifier circuit for amplifying the electric signal output from of the light receiving device, and
the drive controller activates the amplifier circuit when the light receiving device is set to the activated state and deactivates the amplifier circuit when the light receiving device is set to the deactivated state.

3. The light amount measuring apparatus according to claim 1, wherein:
the light receiving device is set to the activated state when the drive controller receives a control signal for setting the light amount measuring apparatus to a light amount measuring mode, and
the light receiving device is set to the deactivated state when the drive controller receives another control signal for resetting the light amount measuring mode.

4. The light amount measuring apparatus according to claim 1, wherein:
the light receiving device is set to the activated state when the drive controller receives a control signal for setting the light amount measuring apparatus to an ON-state, and
the light receiving device is set to the deactivated state when the drive controller receives another control signal for setting the light amount measuring apparatus to an OFF-state.

5. A light amount measuring apparatus comprising:
a light amount measuring circuit; and
a power supply for supplying power to the light amount measuring circuit;
wherein the light amount measuring circuit includes:
a light receiving device for receiving light and outputting an electric signal at an output node of light receiving device, the electric signal corresponding to a light amount of the received light;
an amplifier circuit for amplifying the electric signal output by the light receiving device;
a first switch for switching between electrical connection and disconnection of the light receiving device and the power supply;
a drive controller for controlling the first switch so that the first switch electrically connects the light receiving device to the power supply when the light receiving device is set to an activated state and electrically disconnects the light receiving device from the power supply when the light receiving device is set to a deactivated state, the drive controller additionally activating the amplifier circuit when the light receiving device is set to the activated state and deactivating the amplifier circuit when the light receiving device is set to the deactivated state, and
a second switch for switching between electrical connection and disconnection of the output node of the light receiving device and a ground, and
wherein the drive controller controls the second switch so that the second switch electrically disconnects the output node of the light receiving device from the ground when the light receiving device is set to the activated state and electrically connects the output node of the light receiving device to the ground when the light receiving device is set to the deactivated state.

6. The light amount measuring apparatus according to claim 5, wherein the light receiving device includes:
a first light receiving element disposed between the first switch and the output node; and
a second light receiving element disposed between the output node and the ground.

7. The light amount measuring apparatus according to claim 6, wherein the light receiving device further includes:
an optical filter disposed so as to cover a light incident surface of the second light receiving element and blocking light with specific wavelengths.

* * * * *